United States Patent [19]
Redmond

[11] 3,735,228
[45] May 22, 1973

[54] NON-ELECTRONIC SERVO ACTUATOR

[75] Inventor: William G. Redmond, Dallas, Tex.
[73] Assignee: E-System, Inc., Dallas, Tex.
[22] Filed: Jan. 3, 1972
[21] Appl. No.: 215,064

[52] U.S. Cl. ............................... 318/564, 318/692
[51] Int. Cl. ............................................. G05b 9/02
[58] Field of Search ................ 318/564, 692, 690, 318/657

[56] References Cited

UNITED STATES PATENTS

| | | | |
|---|---|---|---|
| 3,593,092 | 7/1971 | Flippo | 318/564 |
| 2,328,320 | 8/1943 | Baruch et al. | 318/657 X |
| 3,136,698 | 6/1964 | Mann | 318/564 X |
| 3,377,924 | 4/1968 | Spencer et al. | 318/564 X |
| 2,568,588 | 9/1951 | MacGeorge | 318/657 |
| 2,619,526 | 11/1952 | Willman | 318/692 |

*Primary Examiner*—T. E. Lynch
*Attorney*—James D. Willborn, D. Carl Richards and William D. Harris, Jr. et al.

[57] ABSTRACT

In a multiplex channel actuator for developing a linear output motion four servomotors are coupled together in a velocity summing arrangement to produce the required output. Each of the servomotors of the actuator has a control phase winding and a fixed phase winding with the latter connected to a source of energizing AC voltage. The control phase winding of each channel servomotor is interconnected as part of a balanceable circuit including an input movable core transformer and a feedback movable core transformer. A mechanical input motion positions the movable core of the input transformer to generate a control voltage related to the input motion. This voltage, in each of the actuator channels, causes the respective servomotor to be energized thereby developing a mechanical output motion. The mechanical output motion positions the movable core of the feedback transformer, for each actuator channel, to develop a feedback voltage for balancing out the input transducer voltage. Each channel servomotor continues to run until the voltage at the input transducer is balanced by a voltage from the feedback transducer.

17 Claims, 3 Drawing Figures

Patented May 22, 1973  3,735,228

Patented May 22, 1973

NON-ELECTRONIC SERVO ACTUATOR

This invention relates to a multiplex actuator and more particularly to a redundant channel, velocity summing, multiplex actuator without electronic amplification of control signals.

In a control system, the link between a command or input signal generator and a responsive power actuator may be mechanical, pneumatic, hydraulic or electrical. With electrical interconnections between a command or input signal generator and a power actuator, it has heretofore been the practice to transmit a low power, low voltage command signal to the actuator and electronically amplify the signal at the actuator. There has, however, been some reluctance to accept electrical control systems because of the complexity of electronic amplification hardware and the cost thereof. There has also been some reluctance to accept electrical control systems because of the belief that mechanical automatic systems are more reliable. To improve the reliability of electrical control, a system of redundant parallel channels has been implemented.

Heretofore, approaches for providing redundancy have typically resulted in double control chains or channels in which a failure in one channel hopefully would permit the other channels to carry on the necessary command functions. Such a system, depending upon the particular failure suffered, generally experienced at least degradation of control when the failed channel must be "dragged" by the operating channel or channels.

Redundant parallel channels have also significantly improved the reliability of electrical control. Additional reliability may be provided in the electrical control system by eliminating electronic amplification of transmitted signals. Although considerable improvement has been made in the reliability of electronic amplification, when critical reliability is important, the failure rate of electronic amplifiers becomes significant. Without electronic amplification, however, it has heretofore been considered necessary to transmit high power signals over long transmission lines. The drawbacks of such systems are many. A feature of the present invention is the use of two-phase servomotors wherein the fixed phase is excited with a power voltage and the control winding excited from a low power signal. This low power is attainable by a small disagreement (error) between an input command and a servomotor output.

In accordance with the present invention, an electrical connecting link is provided in a control system without electronic amplification. Redundancy in the control system provides reliability upon a failure of one or more actuator channels and transmission of electrical power signals eliminates the need for electronic amplification. In accordance with this invention, a multiplex actuator for positioning a control element in response to a mechanical input motion includes an input transducer responsive to the mechanical motion for generating a plurality of control voltages. These control voltages are transmitted to a plurality of servomotors with each motor responsive to a separate generated voltage. Velocity couplers tied to the outputs of the servomotors produce a single rotary output equal to the velocity sum of the plurality of servomotors. This single rotary output may be used directly or converted into a linear output motion that varies in accordance with the input motion. A feedback transducer responds to the output motion and generates a plurality of feedback voltages which are interconnected with the control voltages in a balancing network for control of the individual servomotors.

In accordance with a more specific embodiment of the invention, a multiplex actuator for producing a position output in response to an input motion includes a movable core input transformer generating a plurality of control voltages. These control voltages are transmitted to a plurality of two-phase electric motors having a fixed phase winding and a control phase winding, the latter responsive to the control voltage. Velocity couplers tied to the output of the individual channel motors produce a single rotary output equal to the velocity sum of the two-phase motors. This rotary output may be used directly or converted into a linear output motion that varies in accordance with the mechanical input motion. A movable core feedback transformer responds to the output motion and generates a plurality of feedback voltages which are connected individually to one of the two-phase electric motors in a balancing network with the input transducer.

A more complete understanding of the invention and its advantages will be apparent from the specification and claims and from the accompanying drawings illustrative of the invention.

Referring to the drawings.

Multiplex actuators in accordance with the present invention find application in industrial control, such as in positioning a control valve element or nuclear reactor control rods, and in aircraft control, such as positioning control surface actuators. Further, although the invention will be described with reference a quadruplex velocity summing actuator, it should be understood that other degrees of multiplexing and single channel actuators may be employed to produce a single motion output in a velocity summing arrangement. The system to be described employs servomotors coupled in pairs by means of differential gear set velocity couplers. By employing other gearing arrangements, the servomotors may be coupled together in other configurations. The couplers employed in the actuator may also provide a reverse drive block to prevent back-driving a malfunctioned channel. It should be further understood that although the output of the multiplex actuator described is in the form of a linear displacement, the actuator may produce a rotary output as a control.

Figure 1:
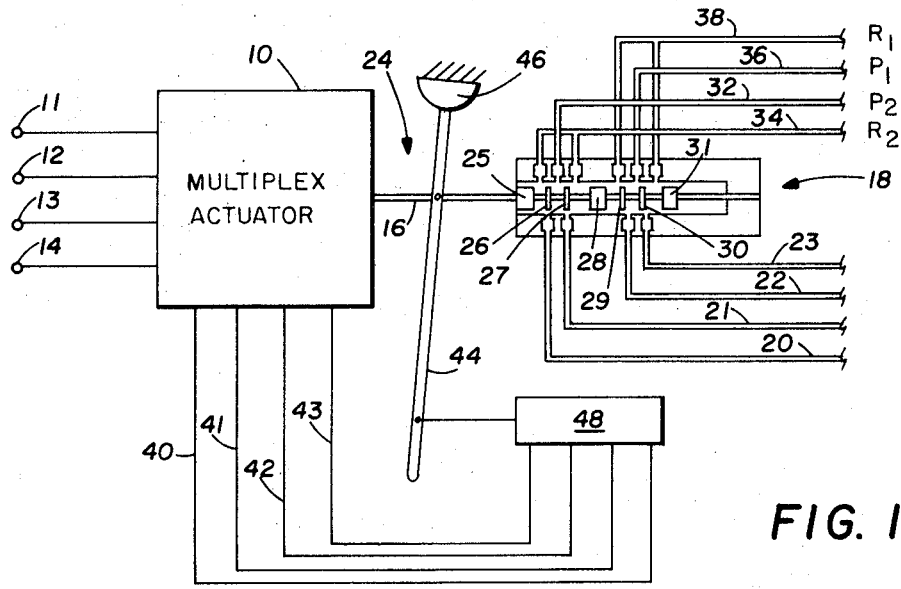
FIG. 1 is a schematic of a redundant control system including a multiplex actuator having a linear output coupled to a servo valve for producing hydraulic signals to position a control element.

Referring to FIG. 1, there is shown a multiplex actuator 10 having four electrical voltages applied to input lines 11–14. These control voltages may be generated by any of several commercially available mechanical-to-electrical transducers that convert a mechanical motion into electrical voltages at the required power level. A mechanical motion input is converted into electrical voltages via the mechanical-to-electrical transducer and these voltages are transmitted to the parallel arrangement of lines 11–14. These lines may be located along different paths to minimize the possibility of disruption of all of the generated control voltages to the actuator 10. In addition to input transducer generated voltages, the control voltages on lines 11-14 may be received from remote sensors, such as pressure and temperature sensors in industrial control or autopilot sensors in aircraft control.

The multiplex actuator 10 produces a linear motion output on a connecting rod 16; the linear motion thereof varying in accordance with the control voltages on the lines 11-14 in a manner to be described. Coupled to the output of the actuator 10, in the system shown, is a duo-tandem servo valve 18 providing fluid pressure-flow signals in lines 20-23. These fluid pressure-flow signals provide the direct positioning control of a final control element, such as a power ram for aircraft control surface positioning.

The servo valve 18 includes a sleeve 19 having a spool valve 24 slidably disposed therein and including interconnected lands 25-31. Conduits 32 and 34 interconnect the first section of the servo valve 18 to a pressure supply and reservoir (neither shown), respectively. Similarly, conduits 36 and 38 connect the second section of the valve 18 to a source of fluid pressure and a fluid reservoir (neither shown), respectively.

Pivotally connected to the connecting rod 16 is a lever 44 having a second end at a fixed pivot 46. Attached to the lever 44 is a linear voltage differential transformer 48 that generates four separate position feedback voltages on lines 40-43. Feedback voltages on the lines 40-43 are applied to the multiplex actuator 10 to balance the generated control voltages on the lines 11-14 to control the motion of the connecting rod 16 and in turn the output fluid pressure-flow signals in lines 20-23.

Figure 2:
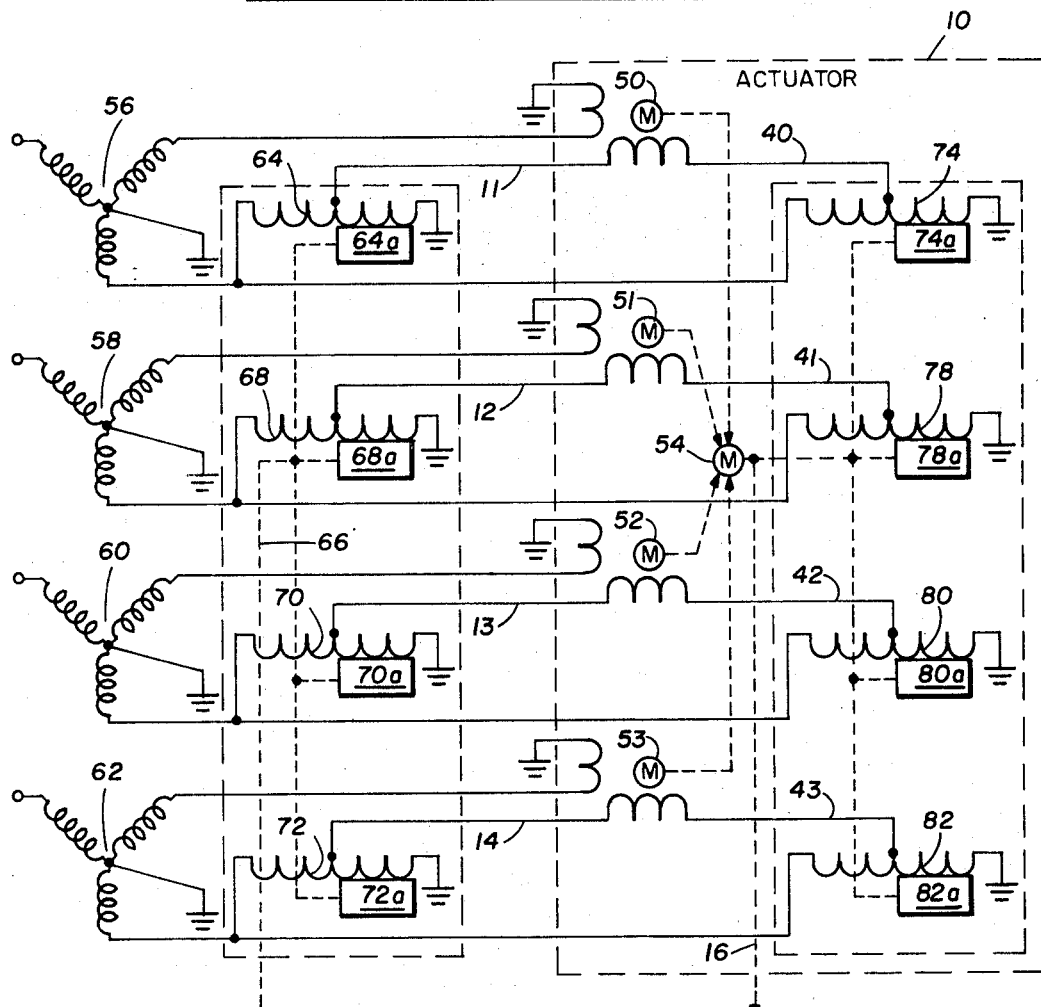
FIG. 2 is a block diagram of a quadruplex input, velocity summing, actuator producing a linear output for coupling to a servo valve.

Referring to FIG. 2, there is shown a quadruplex velocity summing actuator wherein the generated control voltages are provided at the winding tap of four separate movable core autotransformers. At present, quadruplex actuators provide the most favorable degree of redundancy for many actuator applications, but any degree of redundancy may be used with the velocity summing system described. It should be noted, that odd numbers of servomotors may be used with the coupling described to provide the redundancy considered necessary. Further, where redundancy is not essential, a single channel actuator may provide the desired output motion.

Referring to FIG. 2, the system consists of four channels and includes two-phase electric servomotors 50-53 in the actuator 10. Each of the output shafts of the motors 50-53 are shown schematically coupled to a summing unit 54. This summing unit may include differential gear sets coupling the servomotors together in pairs and also includes a rotary-to-linear motion converter for providing a linear output motion at the connecting rod 16.

A source of alternating current voltage for each of the actuator channels consists of a three-phase alternator each with a grounded Y-configuration connection. Alternator 56 provides an AC voltage for the channel of motor 50. Alternator 58 provides an AC voltage for the channel of motor 51, alternator 60 provides an AC voltage for the channel of motor 52 and alternator 62 provides the AC voltage for the actuator channel of motor 53. Each of the fixed windings of the servomotors 50-53 is connected to the same phase of the supply alternator for that channel. The second terminal of the fixed phase winding of each of the servomotors connects to ground, to complete the circuit back to the neutral of the three-phase Y-power source.

In the actuator channel of the servomotor 50, a movable core autotransformer 64 produces the control voltage on line 11 connected to the control phase winding of the motor 50. The autotransformer 64 comprises one section of an input or command transducer for converting a mechanical input motion imposed on a link 66 into four separate but nominally equal control voltages. The control voltage for the channel of servomotor 51 is generated by a movable core autotransformer 68 connected to the control phase winding of the motor 51. In the actuator channel of the servomotor 52, a movable core autotransformer 70 generates the control voltage on line 13. Line 13 connects to one terminal of the control phase winding for the motor 52. The control voltage on line 14 for the actuator channel of the servomotor 53 is generated by a movable core autotransformer 72. Line 14 connects to the control phase winding of the motor 53. The movable cores 64a, 68a, 70a and 72a are mechanically interconnected to the link 66 and moved together in response to the mechanical input motion. With each of the autotransformers 64, 68, 70 and 72 similarly constructed, the control voltages on lines 11-14 vary in the same direction and at approximately the same magnitude. Each of the autotransformers is connected to the same phase of the respective supply alternator at one terminal and at a second terminal connected to ground.

Also included in the channel of the servomotor 50 is a movable core autotransformer feedback transducer 74 connected to the same phase of the alternator 56 as the autotransformer 64 and containing a center tap connected to the control phase winding of the motor 50. The autotransformers 64 and 74 comprise a balanceable electrical network to vary the voltage across the control phase winding of the servomotor 50. In the channel of the servomotor 51, a movable core autotransformer feedback transducer 78 completes a balanceable network with the transformer 68. The transformer 78 connects to the same phase of the alternator 58 as the transformer 68 and includes a center tap connected to line 41 which in turn ties to the control phase winding of the servomotor 51. The actuator channel of the servomotor 52 includes a movable core autotransformer feedback transducer 80 having a center tap connected to the line 42 which in turn connects to the control phase winding of the servomotor 52. The transformers 70 and 80 comprise a balanceable electrical network to control the voltage across the control phase winding of the servomotor 52. Both transformers 70 and 80 are connected to the same phase of the alternator 60. A movable core autotransformer feedback transducer 82, in the actuator channel for the servomotor 53 provides a feedback voltage on the line 43 connected to the control phase winding of the motor 53. The transformer 82 is connected in a balanceable network with the transformer 72 and is energized from the same phase of the alternator 62. Each of the movable cores 74a, 78a, 80a and 82a are mechanically interconnected to the lever 44. With this connection, each of the transformers 74, 78, 80 and 82 provides a feedback signal to the respective servomotor that varies in the same direction and at approximately the same magnitude with the other feedback voltages.

A three-phase alternator of the type illustrated provides a 120° electrical phase angle between the three phases thereof. Thus, there is a 120° phase angle between the voltage applied to the autotransformers of each of the channels and the fixed phase winding of the servomotor for that channel. With this connection, there is, due to the inductance of the transformers and the control phase winding, a slight phase shift (lead) between the voltage applied to the transformers and the voltage across the control winding. This phase lead makes the phase angle between the control winding voltage and the fixed phase winding voltage approach the optimum value of 90° rather than the usual 120° between phase of a three-phase source.

In a model of the actuator tested, the resulting phase shift between the fixed phase winding and the control phase winding of each of the servomotors was approximately 105° Since torque varies as the sine of the phase angle and sin 105° equals 0.965, only 3.5 percent of maximum attainable torque is lost.

In operation, a mechanical input motion applied to the link 66 displaces the movable cores 64a, 68a, 70a and 72a to thereby provide a variation in the control voltage applied to the lines 11–14, respectively. Assuming that each of the servomotors 50–53 was at an at rest position, the voltage across the control phase winding for each of these motors is zero. A change in the voltage at the tap of the autotransformer 64 develops a voltage across the control phase winding of the motor 50 and it is energized. Similarly, the control phase winding for the servomotor 51 has a voltage developed there across by a change in position of the movable core 68a. Each of the servomotors 52 and 53 is similarly energized.

The rotary output of the various servomotors is summed into a single rotary motion in the summing unit 54. An output of the summing unit 54 is a linear motion related to the mechanical input motion at the link 66.

A mechanical motion at the output of the summing unit 54 positions the movable cores 74a, 78a, 80a and 82a to vary the feedback voltage on the lines 40–43, respectively. As each of the movable cores 74a, 78a, 80a and 82a continues to move, the voltage drop developed across the control phase winding of each of the servomotors 50–53, as developed by the transformers 64, 68, 70 and 72 decreases. The servomotors continue to drive and in turn the movable cores of the feedback transducers continue to move until the voltage drop across each of the control phase windings in the various channels is zero. When this condition exists, the servomotors will again be at an at rest position and the new position of the connecting rod 16 will be directly related to the input motion on the link 66.

As an alternate to the system of FIG. 2, each of the movable core autotransformers of the input transducer and each of the movable core autotransformers of the feedback transducer is a standard two winding, movable core, transformer wherein the secondary winding is isolated from the primary winding. This provides the additional features of isolation of the control voltage and the feedback voltage applied to the control phase winding of the respective servomotors from signals on the transmission line. As a further variation to the system of FIG. 2, the fixed phase winding of each of the servomotors is connected across two phases of the supply alternator. Each channel of the system may also be supplied from a single phase source. To provide the required phase shift between the control winding and the fixed phase winding of a two-phase servomotor, a capacitor is connected in the line to the fixed phase winding, such a capacitor providing the phase shift.

Figure 3:
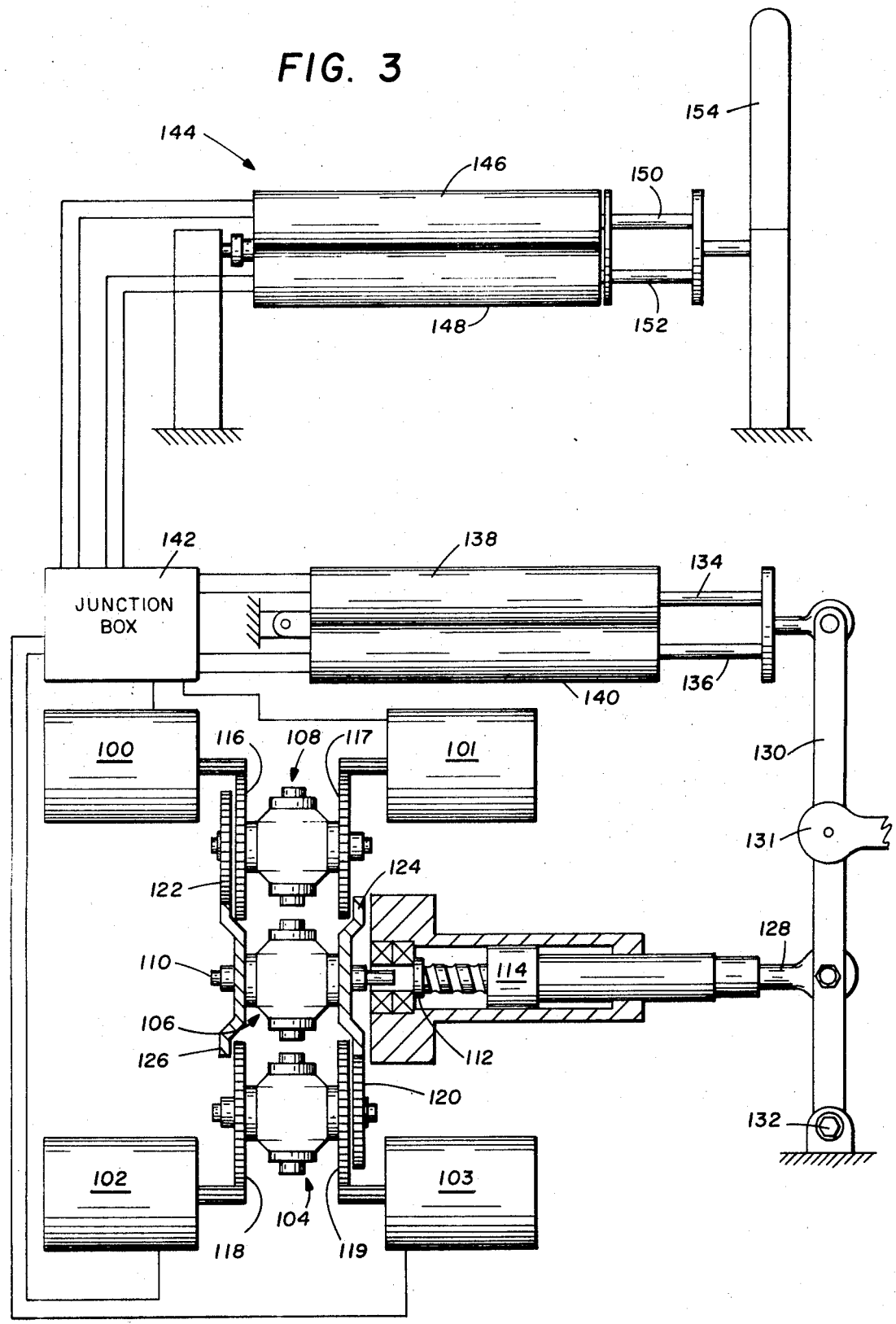
FIG. 3 is a mechanical schematic of a multiplex actuator including a movable core input transducer.

Referring to FIG. 3, there is shown a mechanical schematic of a quadruplex velocity summing actuator wherein gear sets are employed as differentials for velocity coupling four channels into a single velocity output. The velocity of the output shaft of the servomotors 100–103 are summed by differential gear sets 104, 106 and 108. The velocity sum of the four motor units results in a single rotary motion at the output shaft 110 of the differential gear set 106. This rotary motion is converted into a linear motion by operation of a lead screw 112 and a nut 114.

In a typical embodiment of the differential gear set arrangement shown, there are 20 gear teeth on the output shaft of the motor units 100–103. These shafts engage spur gears 116–119, respectively, having 180 teeth. The output spur gear 120 of the differential 104 and the output spur gear 122 of the differential 108, along with the spur gears 124 and 126 have 119 gear teeth. In this typical embodiment, a 0.250 inch lead screw 112 was coupled to the output shaft 110. Using 10,000 RPM motor units, the linear velocity of the rod end 128 can be calculated. The total linear velocity of the rod end 128 is equal to the calculated figure times the number of motor units operating. Thus, even if all the motor units but one jams or become inoperative for any reason, the rod end 128 is positionable over its full stroke and the actuator delivers the same force to position any device as if all four channels were active and operating.

As explained previously, a multiplex actuator may include an odd number of servomotors, the velocities of which are to be summed. Assume that only three motor units were considered for the actuator of FIG. 3, then if units 100, 101 and 102 are to be velocity summed, the units 100 and 101 are connected as illustrated. Unit 102, on the other hand, is connected directly to the spur gear 124 through its output shaft. The velocity of this unit is then summed with the velocity of the spur gear 122 of the differential 108. If more than two motor pairs are to be summed, additional differential gear sets are required. The number of differential gear sets required in a system is equal to one less than the number of servomotor outputs to be summed. The end result in any case is a single rotary output at the shaft 110.

Referring again to the four-channel system illustrated in FIG. 3, the rod end 128, in addition to positioning a control element through an output shaft 131, rotates a connecting link 130 around a pivot 132 to position movable cores 134 and 136 of linear voltage differential transformers 138 and 140, respectively. Two similar two-channel linear voltage differential transformers (LVDT) are illustrated responsive to movement of the rod end 128 through the connecting link 130. Each of the two-channel LVD transformers 138, 140 provide two electrical feedback voltages to a junction box 142. These four feedback voltages are connected in a balanceable electrical network, as shown in FIG. 2, with the control voltages of an input transducer 144 also consisting of two two-channel linear voltage differential transformers 146 and 148. Movable cores 150 and 152 of the transformers 146 and 148, respectively, are positioned in accordance with a mechanical input motion produced by a control stick 154. The control stick 154 is intended to illustrate the various mechanical motions that may be employed to position the movable cores 150 and 152. This mechanical input motion may be produced by a temperature or pressure sensor in an industrial process or by a pilot control stick in aircraft control.

Each of the transformers 146 and 148 produces two similar control voltages coupled to the junction box 142. From the junction box 142 four motor lines are provided to the servomotors 100–103.

The operation of the mechanical schematic of FIG. 3 is similar to the system of FIG. 2. A movement of the control stick 154 displaces the movable cores 150 and 152 to change the control voltages from the transformers 146 and 148 to the junction box 142. This provides a voltage across the control phase winding of each of the servomotors 100–103. Rotation of the servomotors 100–103 is summed through the differentials 104, 106 and 108 to provide a velocity output on the shaft 110. This rotary motion is converted by the lead screw 112 and ball 114 into a linear motion at the rod end 128. The rod end 128 repositions the link 130 and in turn repositions the movable cores 134 and 136 of the transformers 138 and 140, respectively. This changes the feedback voltages from the transformers 138 and 140 to balance the control voltages from the input transducer 144. The rod end 128 continues to move until a balance is reached and the servomotors 100–103 are at an at rest position.

While only one embodiment of the invention, together with modifications thereof, has been described in detail herein and shown in the accompanying drawings, it will be evident that various further modifications are possible without departing from the scope of the invention.

What is claimed is:

1. A multiplex channel actuator for developing a linear motion output in accordance with a mechanical input motion, comprising:
    input means responsive to the mechanical input motion for generating a plurality of control voltages at individual output terminals,
    a plurality of servomotors for the actuator channels with each motor direct connected to an output terminal of said input means and responsive to a separate generated control voltage,
    means for coupling the output of each of said servomotors to produce a single rotary output equal to the sum of said plurality of servomotors,
    means for converting the rotary output of the coupling means into a linear output that varies in accordance with the generated voltages, and
    a feedback transducer responsive to the linear output for generating a plurality of feedback voltages individually applied directly to one of said plurality of servomotors in a balancing network with a control voltage.

2. A multiplex channel actuator for developing a linear motion output as set forth in claim 1 including supply means for generating the energizing voltage to said input means, said servomotors and said feedback transducer.

3. A multiplex channel actuator for developing a linear motion output as set forth in claim 1 wherein said servomotors are two-phase, electric motors having a fixed phase winding and a control phase winding, the latter connected to the input means and responsive to the control voltage and also connected to said feedback transducer.

4. A multiplex channel actuator for developing a linear motion output as set forth in claim 1 wherein said input means includes a movable core transformer having a plurality of windings individually direct connected to the respective channel servomotor for producing a separate control voltage for each channel servomotor.

5. A multiplex channel actuator for developing a linear motion output as set forth in claim 1 wherein said feedback transducer includes a movable core transformer having a plurality of windings individually direct connected to the respective channel servomotor for producing a feedback voltage for each channel servomotor.

6. A multiplex channel actuator for developing a linear motion output in accordance with a mechanical input motion, comprising:
    an input transducer in each actuator channel generating a control voltage at an output terminal thereof to be responsive to the mechanical input motion and generating a control voltage,
    a servomotor in each actuator channel connected to the output terminal of the respective input transducer and responsive to the control voltage thereof,
    means for velocity coupling the output of each of said servomotors to produce a single rotary output equal to the velocity sum of said plurality of servomotors,
    means for converting the rotary output of the velocity coupling means into a linear output that varies in accordance with the generated control voltages, and
    a feedback transducer in each actuator channel responsive to the linear output and generating a channel feedback voltage applied directly to the channel servomotor for balancing the control voltage.

7. A multiplex channel actuator for developing a linear motion output as set forth in claim 6 wherein said input transducer is a movable core transformer having a winding direct connected to the respective channel servomotor for providing the control voltage in accordance with the position of the movable core.

8. A multiplex channel actuator for developing a linear motion output as set forth in claim 7 wherein said feedback transducer includes a movable core transformer having a winding direct connected to the respective channel servomotor for providing a feedback voltage in accordance with the position of the movable core.

9. A multiplex channel actuator for developing a linear motion output as set forth in claim 8 wherein said servomotors are two-phase, electric motors having a fixed phase winding and a control phase winding, the latter connected to the winding of said movable core transformer of the input transducer and also connected to the winding of said movable core transformer of the feedback transducer.

10. A multiplex channel actuator for developing a linear motion output as set forth in claim 9 including supply means for generating the energizing voltage to said input transducers, said servomotors and said feedback transducers.

11. A multiplex channel actuator for developing an output that varies in accordance with a mechanical input motion, comprising:
  input means responsive to the mechanical input motion for generating a plurality of control voltages at individual output terminals,
  a plurality of servomotors for the actuator channels with each motor direct connected to the output terminal of said input means and responsive to a separate generated control voltage,
  means for coupling the output of each of said servomotors to produce a single rotary output equal to the sum of said plurality of servomotors, and
  a feedback transducer responsive to the single rotary output for generating a plurality of feedback voltages individually applied directly to one of said plurality of servomotors in a balancing network with a control voltage.

12. A multiplex channel actuator for developing an output as set forth in claim 11 wherein said input means includes a movable core transformer having a plurality of windings direct connected to the individual channel servomotors with the movable core responsive to the mechanical input motion and generating a plurality of control voltages.

13. A multiplex channel actuator for developing an output as set forth in claim 12 wherein said feedback transducer includes a movable core transformer having a plurality of windings direct connected to the individual channel servomotors with the movable core responsive to the single rotary output and generating the plurality of feedback voltages.

14. A multiplex channel actuator for developing an output as set forth in claim 13 wherein said first and second movable core transformers are connected in an autotransformer configuration.

15. A multiplex channel actuator for developing an output that varies in accordance with a mechanical input motion, comprising:
  a two-phase power supply,
  an input transducer connected across the first phase of said power supply in each actuator channel and generating a control voltage at an output terminal thereof in response to the movement of the mechanical input,
  a two-phase servomotor in each actuator channel having a fixed phase winding connected to the second phase of said power supply and a control phase winding having one terminal connected to the output terminal of the respective input transducer and responsive to the control voltage thereof,
  means for velocity coupling the output of each of said servomotors to produce a single rotary output equal to the velocity sum of said plurality of servomotors, and
  a feedback transducer in each actuator channel connected across the first phase of said power supply and responsive to the single rotary output and generating a channel feedback voltage at an output terminal connected to the second terminal of the control phase winding of the channel servomotor for balancing the control voltage.

16. An actuator as set forth in claim 15 wherein said servomotor includes a fixed phase winding energized from a supply source and a control phase winding connected in the balancing network with the input movable core transformer and the feedback movable core transformer.

17. An actuator for developing an output voltage as set forth in claim 16 wherein said first and second movable core transformers are connected in an autotransformer configuration.

* * * * *